(12) United States Patent
Tokoro et al.

(10) Patent No.: US 10,656,883 B2
(45) Date of Patent: May 19, 2020

(54) OPERATION SWITCH DEVICE, IMAGE FORMING APPARATUS

(71) Applicant: KYOCERA Document Solutions Inc., Osaka-shi, Osaka (JP)

(72) Inventors: Yoshitaka Tokoro, Osaka (JP); Yoshiaki Tashiro, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/540,427

(22) Filed: Aug. 14, 2019

(65) Prior Publication Data

US 2020/0065038 A1 Feb. 27, 2020

(30) Foreign Application Priority Data

Aug. 24, 2018 (JP) ................... 2018-156934

(51) Int. Cl.
*G06F 3/12* (2006.01)
*H01H 21/02* (2006.01)
(Continued)

(52) U.S. Cl.
CPC .......... *G06F 3/1221* (2013.01); *G06F 3/1229* (2013.01); *H01H 21/025* (2013.01);
(Continued)

(58) Field of Classification Search
CPC ... G06F 3/1221; G06F 3/1229; H01H 21/025; H01H 21/24; H01H 2217/01; H04N 1/0049; H04N 1/00896
See application file for complete search history.

(56) References Cited

U.S. PATENT DOCUMENTS

2006/0060463 A1 3/2006 Tokusashi
2007/0007113 A1 1/2007 Watanabe
(Continued)

FOREIGN PATENT DOCUMENTS

JP H07016337 U 3/1995
WO 2012165010 A1 12/2012

OTHER PUBLICATIONS

European Patent Office, Extended European Search Report Issued in Application No. 19192191.5, dated Jan. 24, 2020, Germany, 9 pages.

*Primary Examiner* — Quang N Vo
(74) *Attorney, Agent, or Firm* — Alleman Hall Creasman & Tuttle LLP

(57) ABSTRACT

In a push button portion of a button member, a first supported portion is supported by a push-in portion of a push-in type switch. A second supported portion is supported in a second area by an electronic board. The second area is adjacent to one side of the electronic component. The push-in type switch is present in a first area which is adjacent to another side of the electronic component that is opposite to the one side. An elastic portion connects a portion including the second supported portion to a portion including the push button portion and the first supported portion. A plurality of guided portions are restricted by a plurality of guide projection portions projecting from an exterior member, from being displaced in a direction intersecting a depth direction. The plurality of guide projection portions are provided in the first area and the second area.

7 Claims, 4 Drawing Sheets

(51) Int. Cl.
*H01H 21/24* (2006.01)
*H04N 1/00* (2006.01)
*H01H 89/10* (2006.01)

(52) U.S. Cl.
CPC .......... *H01H 21/24* (2013.01); *H04N 1/0049* (2013.01); *H04N 1/00896* (2013.01); *H01H 2217/01* (2013.01)

(56) References Cited

U.S. PATENT DOCUMENTS

2011/0284352 A1* 11/2011 Kitahara ................ H01H 13/06
 200/341
2017/0060062 A1* 3/2017 Araishi .............. G03G 15/5016

* cited by examiner

OPERATION SWITCH DEVICE, IMAGE FORMING APPARATUS

INCORPORATION BY REFERENCE

This application is based upon and claims the benefit of priority from the corresponding Japanese Patent Application No. 2018-156934 filed on Aug. 24, 2018, the entire contents of which are incorporated herein by reference.

BACKGROUND

The present disclosure relates to an operation switch device and an image forming apparatus including the operation switch device.

An electronic device such as an image forming apparatus may include a push-button type operation switch device. The operation switch device includes an exterior member, a button member made of a synthetic resin, and an electronic board on which a push-in type switch is implemented.

The push-in type switch is what is called a tactile switch. The push-in type switch includes a main body portion and a push-in portion. The push-in portion is what is called a plunger. When the push-in portion is pressed toward the main body portion, the push-in type switch is switched between an ON state and an OFF state.

The button member includes a push button portion which is partially inserted in an opening of the exterior member. When the user presses the push button portion, a part of the button member presses the push-in portion of the push-in type switch, thereby switching the state of the push-in type switch.

In addition, an LED (Light Emitting Diode) element may be implemented in the electronic board, wherein the LED element illuminates the push button portion from the rear surface side.

In a case where the push-in portion of the push-in type switch supports the rear surface of the push button portion or supports a portion projecting from the rear surface of the push button portion, the button member is stably supported by the push-in portion of the push-in type switch.

In the above-described case, no matter what portion of the push button portion is pressed, the button member moves in parallel, and the state of the push-in type switch is surely switched.

SUMMARY

An operation switch device according to an aspect of the present disclosure includes an exterior member, a button member, and an electronic board. An opening is formed in the exterior member. The button member includes a push button portion and an inner portion. The push button portion is partially inserted in the opening of the exterior member. The push button portion includes an operation surface that is exposed to outside through the opening of the exterior member. The inner portion is formed inside the exterior member integrally with the push button portion. An electronic component and a push-in type switch are implemented on the electronic board. The electronic component faces a rear surface of the push button portion. The rear surface is on an opposite side to the operation surface. The push-in type switch is aligned with the electronic component. The exterior member includes a plurality of guide projection portions that project from an inner surface of the exterior member in a depth direction perpendicular to the electronic board. The inner portion includes a first supported portion, one or more second supported portions, one or more elastic portions, and a plurality of guided portions. The first supported portion is supported by a push-in portion of the push-in type switch. The one or more second supported portions are supported in a second area by the electronic board. The second area is adjacent to one side of the electronic component when viewed in the depth direction. The push-in type switch is present in a first area which is adjacent to another side of the electronic component that is opposite to the one side when viewed in the depth direction. The one or more elastic portions connect a portion including the second supported portions to a portion including the push button portion and the first supported portion. The one or more elastic portions are elastically deformed when the push button portion is displaced in a direction of approaching the electronic board by an external force acting on the operation surface. The plurality of guide projection portions are inserted in the plurality of guided portions such that the plurality of guide projection portions restrict the plurality of guided portions from being displaced in a direction intersecting the depth direction. The plurality of guide projection portions include: one or more first guide projection portions that are provided in the first area when viewed in the depth direction; and one or more second guide projection portions that are provided in the second area when viewed in the depth direction. The plurality of guided portions include: one or more first guided portions that correspond to the one or more first guide projection portions; and one or more second guided portions that correspond to the one or more second guide projection portions.

An image forming apparatus according to another aspect of the present disclosure executes a print process to form an image on a sheet. The image forming apparatus includes the operation switch device and a control device. The electronic component of the operation switch device is a light emitting diode element. The control device switches the image forming apparatus from a standby state to a power saving state when the push-in type switch detects pressing of the push button portion of the operation switch device while the print process is not executed, wherein in the standby state, the light emitting diode element is lighted off and the print process can quickly be started being executed, and in the power saving state, the light emitting diode element is lighted on and smaller power is consumed than in the standby state.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 10]

Figure 1:
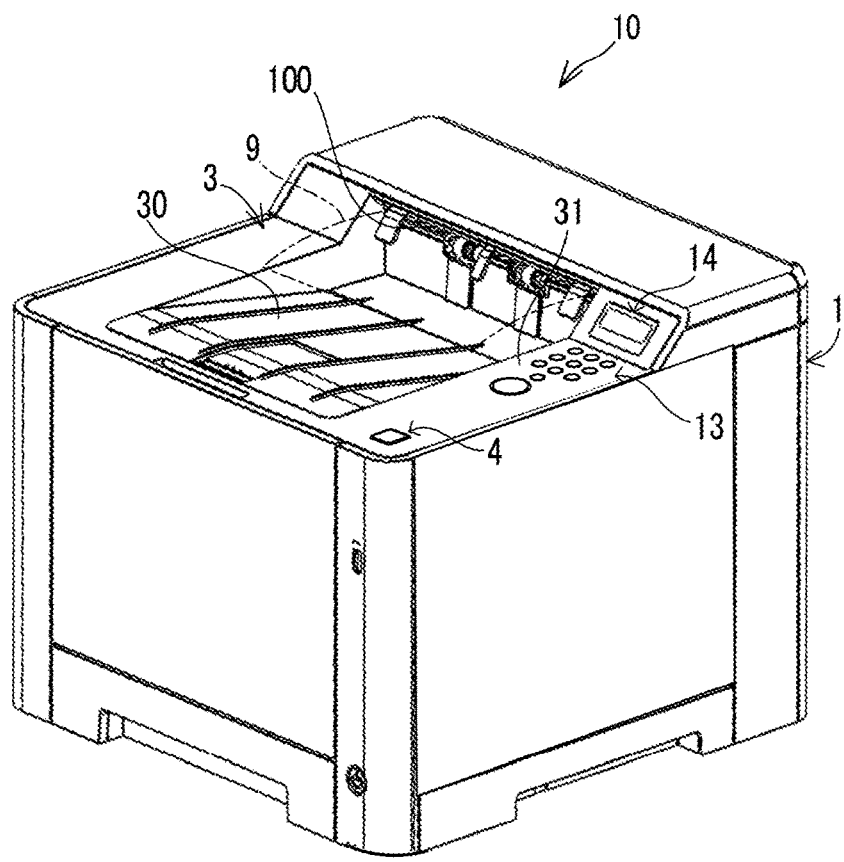
FIG. 1 is a perspective diagram of an image forming apparatus including an operation switch device according to an embodiment of the present disclosure.

As shown in FIG. 1, an operation switch device 4 according to the embodiment of the present disclosure is included in an image forming apparatus 10. The image forming apparatus 10 executes a print process to form an image on a sheet 9.

In the image forming apparatus 10, the operation switch device 4 constitutes a part of an operation device 13 that receives operations of users.

The image forming apparatus 10 includes an upper exterior member 3 that forms an upper surface of a main body portion 1. The upper exterior member 3 includes a discharge tray 30 and an operation cover portion 31. The upper exterior member 3 is made of a synthetic resin such as polypropylene, polyethylene, polyvinylchloride, polybuthylene terephthalate, or polyamide.

The discharge tray 30 is configured to receive the sheet 9 with an image formed thereon, discharged from a sheet discharge port 100 of the main body portion 1. The operation cover portion 31 forms an exterior of the operation device 13 including the operation switch device 4.

Figure 2:
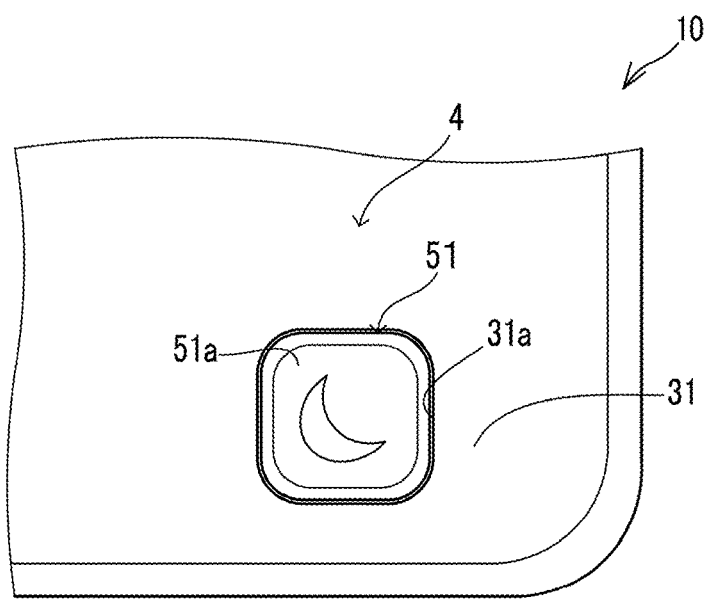
FIG. 2 is a plan diagram of the operation switch device according to the embodiment of the present disclosure.
Figure 4:
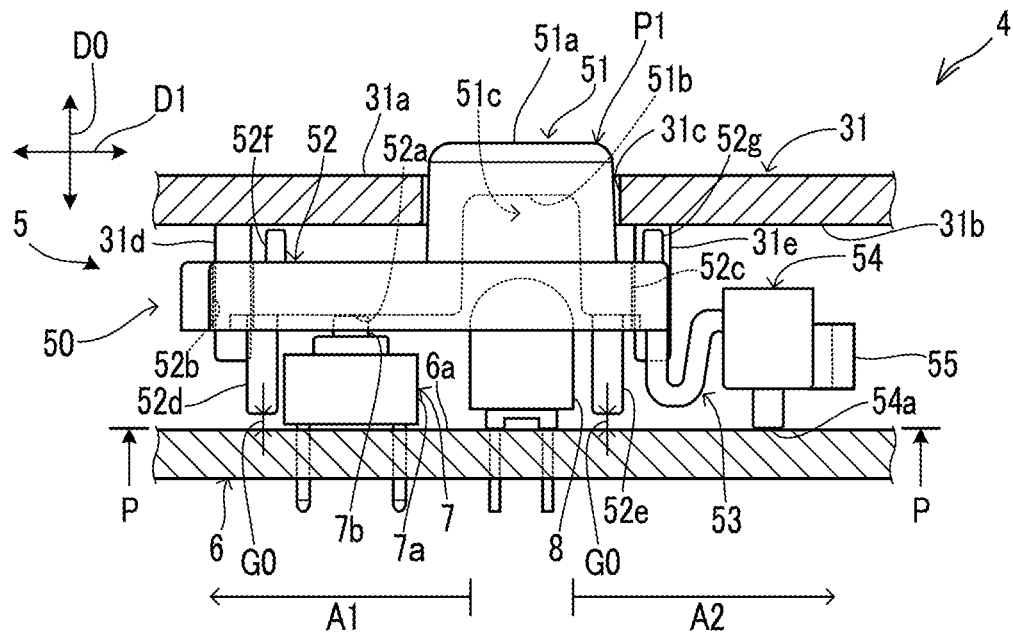
FIG. 4 is a side diagram (including a partial cross-section) of the operation switch device in a reference state according to the embodiment of the present disclosure.

As shown in FIG. 4, an opening 31c is formed in the operation cover portion 31. As shown in FIG. 2, the operation switch device 4 includes a push button portion 51 which is partially inserted in the opening 31c of the operation cover portion 31. The push button portion 51 includes an operation surface 51a that is pressed by users, wherein the operation surface 51a is exposed to outside through the opening 31c of the operation cover portion 31.

Figure 3:
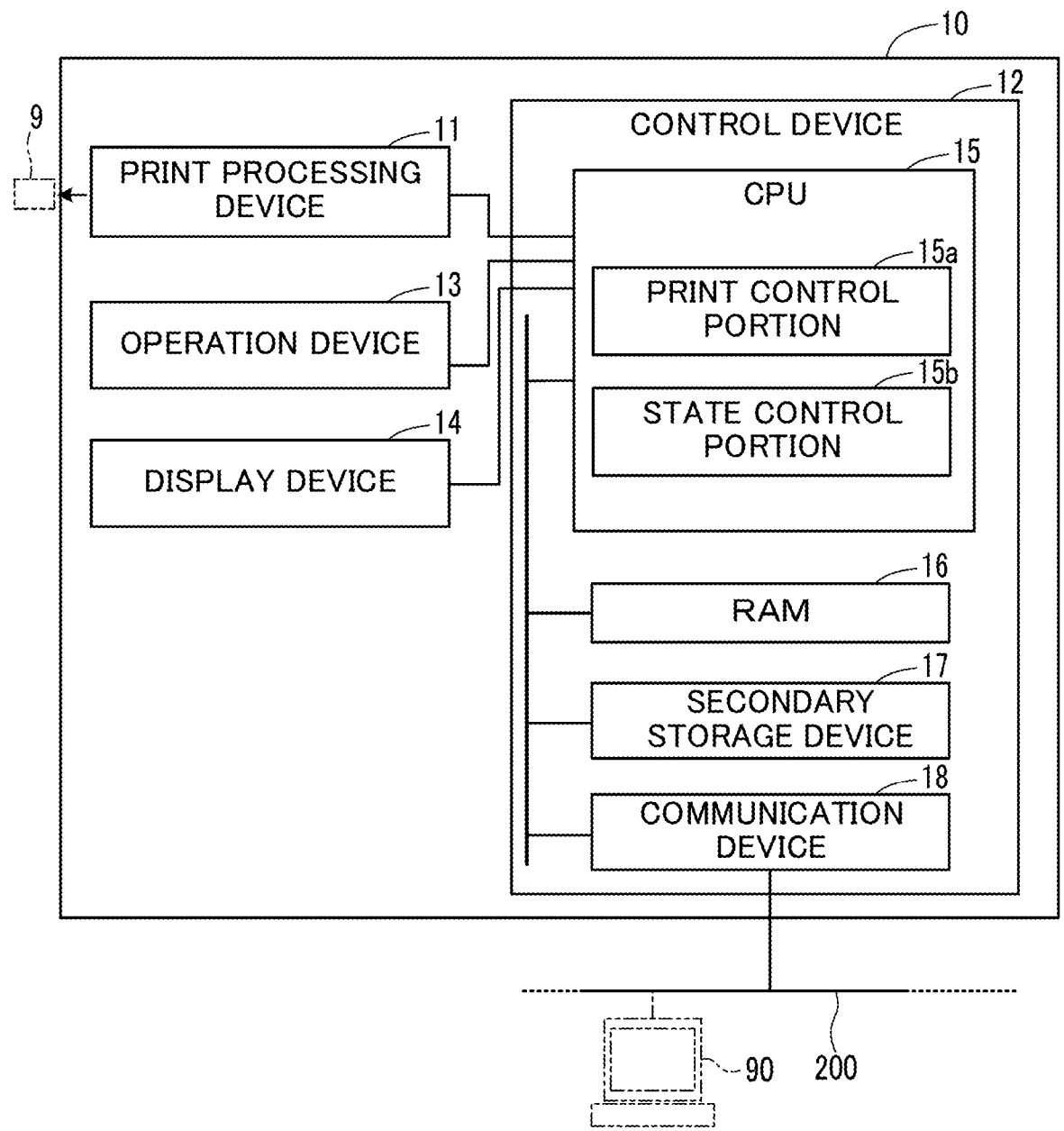
FIG. 3 is a block diagram showing a configuration of the image forming apparatus including the operation switch device according to the embodiment of the present disclosure.

As shown in FIG. 3, the image forming apparatus 10 includes a print processing device 11, a control device 12, an operation device 13, and a display device 14.

The print processing device 11 executes the print process in accordance with a command from the control device 12. For example, the print processing device 11 executes the print process by an electrophotographic method or an inkjet method.

The display device 14 is a panel display device configured to display information. For example, the display device 14 is a liquid crystal display or an organic electroluminescence display.

The control device 12 includes a CPU (Central Processing Unit) 15, a RAM (Random Access Memory) 16, a secondary storage device 17, and a communication device 18.

The communication device 18 is a communication interface device configured to perform a communication with a host apparatus 90 via a network 200, the host apparatus 90 being a personal computer or the like. The CPU 15 performs all data transmissions and receptions to/from the host apparatus 90 via the communication device 18.

The RAM 16 is a computer-readable volatile storage device. The RAM 16 primarily stores: programs executed by the CPU 15; and data that is output or consulted by the CPU 15 during execution of the programs.

The secondary storage device 17 is a nonvolatile storage device from/to which a computer can read and write data. The secondary storage device 17 stores the programs executed by the CPU 15, and other data. For example, the secondary storage device 17 includes a flash SSD (Solid State Drive), an EEPROM (Electrically Erasable Programmable Read-Only Memory), or a hard disk device.

The CPU 15 operates as a print control portion 15a and a state control portion 15b by executing the programs.

The print control portion 15a causes the print processing device 11 to execute the print process by controlling electric devices such as various types of motors and a heater included in the print processing device 11.

The state control portion 15b switches the state of the image forming apparatus 10 between a standby state and a power saving state. In the standby state, the image forming apparatus 10 can quickly start executing the print process. In the power saving state, smaller power is consumed than in the standby state.

[Outline of Operation Switch Device 4]

Figure 5:
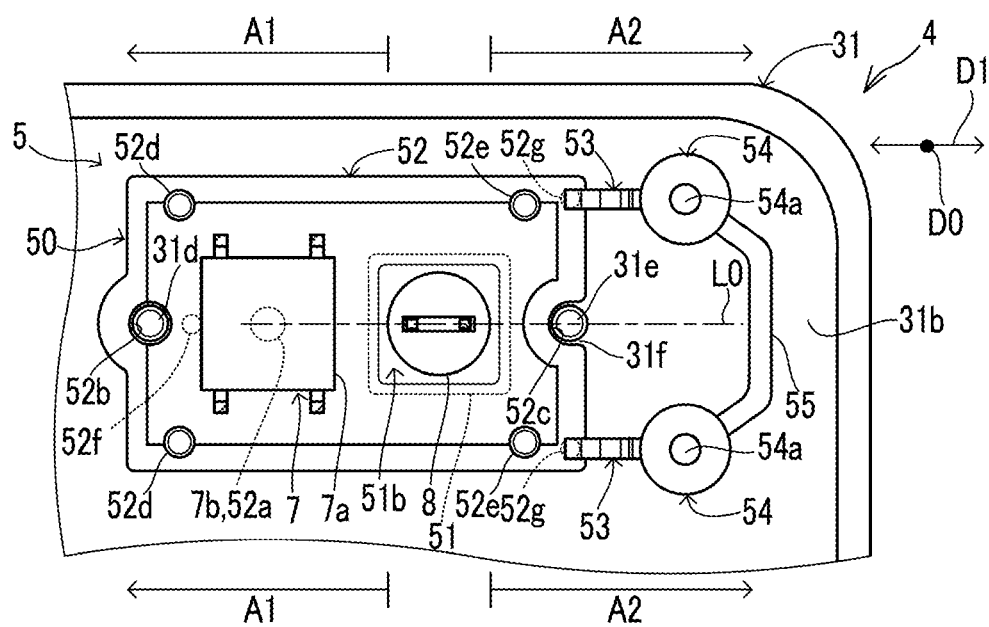
FIG. 5 is a diagram of a portion, above an electronic board, of the operation switch device viewed from below according to the embodiment of the present disclosure.

As shown in FIG. 4 and FIG. 5, the operation switch device 4 includes: the operation cover portion 31 that is a part of the upper exterior member 3; a button member 5 including the push button portion 51; and an electronic board 6.

The button member 5 is made of a synthetic resin such as polypropylene, polyethylene, polyvinylchloride, polybuthylene terephthalate, or polyamide. As described above, the push button portion 51 is partially inserted in the opening 31c of the operation cover portion 31 (see FIG. 4).

In an example shown in FIG. 4, a part, including the operation surface 51a, of the push button portion 51 projects from an outer surface 31a of the operation cover portion 31. Not limited to this, however, the push button portion 51 may be inserted in the opening 31c such that the operation surface 51a is flush with the outer surface 31a of the operation cover portion 31.

On the electronic board 6, a tactile switch 7 and an LED element 8 are implemented. The tactile switch 7 is an example of a push-in type switch. The LED element 8 is an example of an electronic component.

The tactile switch 7 includes a main body portion 7a and a push-in portion 7b, wherein the push-in portion 7b projects from the main body portion 7a toward the operation cover portion 31. The push-in portion 7b is what is called a plunger. When the push-in portion 7b is pressed toward the main body portion 7a, the tactile switch 7 is switched between an ON state and an OFF state.

That is, in the operation switch device 4, the tactile switch 7 detects pressing of the push button portion 51. The detection result of the tactile switch 7 is input to the CPU 15.

The LED element 8 is disposed to face a rear surface 51b of the push button portion 51, wherein the rear surface 51b is on the opposite side to the operation surface 51a. The LED element 8 and the tactile switch 7 are implemented in alignment on the electronic board 6.

A part or all of the operation surface 51a of the push button portion 51 is transparent or an opening such that light from the LED element 8 can pass therethrough.

In the following description, a direction in which the LED element 8 and the tactile switch 7 are aligned is referred to as a component alignment direction D1. The LED element 8 and the tactile switch 7 are disposed on a main surface 6a of the electronic board 6 that faces an inner surface 31b of the operation cover portion 31.

In the following description, a direction perpendicular to the electronic board 6 is referred to as a depth direction D0. The push button portion 51 is pressed in the depth direction D0 from outside toward inside of the operation cover portion 31. It is noted that in the present embodiment, the depth direction D0 is a vertical direction.

The tactile switch 7 is positioned not to overlap with the push button portion 51 when viewed in the depth direction D0 (see FIG. 5).

When the user presses the push button portion 51, a part of the button member 5 presses the push-in portion 7b of the tactile switch 7, thereby switching the state of the tactile switch 7.

In a configuration where the push-in portion 7b of the tactile switch 7 supports the rear surface 51b of the push button portion 51 or supports a portion projecting from the rear surface 51b of the push button portion 51, the button member 5 is stably supported by the push-in portion 7b of the tactile switch 7.

When the tactile switch 7 detects pressing of the push button portion 51 of the operation switch device 4 while the print processing device 11 does not execute the print process, the state control portion 15b of the CPU 15 transfers the image forming apparatus 10 from the standby state to the power saving state.

In the standby state, the state control portion 15b lights off the LED element 8; and in the power saving state, the state control portion 15b lights on the LED element 8. That is, in the standby state, the LED element 8 is off and the print process can be executed. On the other hand, in the power saving state, the LED element 8 is on, and smaller power is consumed than in the standby state.

For example, in the standby state, the state control portion 15b maintains the conduction state of the display device 14; and in the power saving state, the state control portion 15b stops feeding power to the display device 14. Furthermore, in the standby state, the state control portion 15b operates the CPU 15 in a normal mode; and in the power saving state, the state control portion 15b operates the CPU 15 in a power saving mode.

When a predetermined returning event occurs when the image forming apparatus 10 is in the power saving state, the state control portion 15b transfers the image forming apparatus 10 from the power saving state to the standby state.

For example, the returning event is that a request for the print process is received from the host apparatus 90, or that the tactile switch 7 detects pressing of the push button portion 51.

Meanwhile, the size of the push button portion 51 may be restricted due to the appearance of the operation switch device 4 or the like. In that case, as shown in FIG. 4 and FIG. 5, the LED element 8 may be positioned to face the rear surface 51b of the push button portion 51, and the tactile switch 7 may be positioned to face a portion of the button member 5 that is outside the push button portion 51.

In the above-described case, the portion of the button member 5 that is outside the push button portion 51 is supported by the push-in portion 7b of the tactile switch 7.

In the case where the push-in portion 7b of the tactile switch 7 supports the portion of the button member 5 that is outside the push button portion 51, if a first edge portion P1 of the push button portion 51 located far away from the push-in portion 7b is pressed, the following operation failure may occur.

That is, when the first edge portion P1 of the push button portion 51 is pressed, a portion of the button member 5 close to the pressed position is elastically deformed, and the button member 5 is apt to be inclined to rotate around a portion of the button member 5 that is supported by the push-in portion 7b.

When the button member 5 is inclined as described above, the push-in portion 7b of the tactile switch 7 is not sufficiently pressed by the button member 5. This causes an operation failure in which the state of the tactile switch 7 is not switched appropriately in response to the operation of the push button portion 51.

Figure 6:
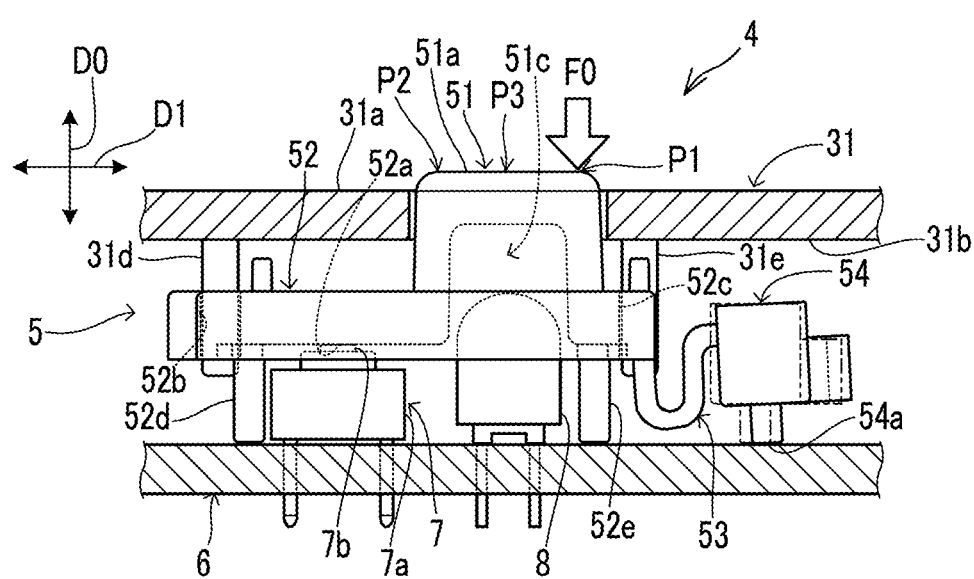
FIG. 6 is a side diagram (including a partial cross-section) of the operation switch device in an operation state according to the embodiment of the present disclosure.

In the operation switch device 4 shown in FIG. 4 to FIG. 6, the LED element 8 is disposed to face the rear surface 51b of the push button portion 51. In addition, due to the restriction on the size of the push button portion 51, the tactile switch 7 is positioned to be outside the push button portion 51 when viewed in the depth direction D0. The operation switch device 4 has a structure to avoid the operation failure even in such a case.

[Details of Operation Switch Device 4]

As shown in FIG. 4 and FIG. 6, the operation cover portion 31 includes a plurality of guide projection portions 31d, 31e that project from the inner surface 31b in the depth direction D0.

In the following description, an area in which the tactile switch 7 is present and which is adjacent to one side of the LED element 8 when viewed in the depth direction D0, is referred to as a first area A1, and an area that is adjacent to another side of the LED element 8 opposite to the first area A1, is referred to as a second area A2.

The plurality of guide projection portions 31d, 31e include one or more first guide projection portions 31d provided in the first area A1 when viewed in the depth direction D0, and include one or more second guide projection portions 31e provided in the second area A2 when viewed in the depth direction D0.

The button member 5 includes the push button portion 51 and an inner portion 50 that is formed inside the operation cover portion 31 integrally with the push button portion 51.

A hollow portion 51c is formed in the push button portion 51 in such a way as to hold, inside thereof, a part of the LED element 8.

The inner portion 50 includes a base portion 52 that continues to the push button portion 51, one or more elastic portions 53 that continue to the base portion 52, and one or more leg portions 54 that continue to the elastic portions 53.

As shown in FIG. 5, the inner portion 50 of the present embodiment includes two leg portions 54 and two elastic portions 53 that correspond to each other. Furthermore, the inner portion 50 includes a coupling portion 50 configured to couple the two leg portions 54 with each other. This positionally stabilizes the two leg portions 54.

The base portion 52 includes a first supported portion 52a that is supported by the push-in portion 7b of the tactile switch 7 in the first area A1 when viewed in the depth direction D0. In addition, each of the leg portions 54 includes a second supported portion 54a that is supported by the main surface 6a of the electronic board 6 in the second area A2 when viewed in the depth direction D0.

As shown in FIG. 5, two second supported portions 54a are arranged in line symmetry with respect to a straight line L0 that passes through the center of the push-in portion 7b of the tactile switch 7 and the center of the push button portion 51 when viewed in the depth direction D0.

Accordingly, the first supported portion 52a and the two second supported portions 54a are positioned at three vertices of an isosceles triangle that surrounds the LED element 8 and the push button portion 51. This enables the button member 5 to be supported stably by the three-point support.

The elastic portions 53 connect the leg portions 54 including the second supported portions 54a to the base portion 52 including the push button portion 51 and the first supported portion 52a. More specifically, the elastic portions 53 connect the leg portions 54 to a portion of the base portion 52 that is positioned in the second area A2 when viewed in the depth direction D0.

The elastic portions 53 are elastically deformed when the push button portion 51 is displaced in a direction of approaching the electronic board 6 by an external force acting on the operation surface 51a. In the present embodiment, the elastic portions 53 are formed to be folded in the depth direction D0 (see FIG. 4).

With adoption of a shape of being folded in the depth direction D0, it is possible to realize, without increasing an occupancy area of the elastic portions 53, the elastic portions 53 that are elastic while having a thickness sufficient enough to ensure required strength.

FIG. 6 shows a state when the push button portion 51 has been pressed, the elastic portions 53 have been deformed, the push button portion 51 and the base portion 52 of the button member 5 have been displaced in a direction of approaching the electronic board 6, the first supported portion 52a has pressed the push-in portion 7b, and the state of the tactile switch 7 has been switched.

The base portion 52 includes a plurality of guided portions 52b, 52c that correspond to the plurality of guide projection portions 31d, 31e. The guide projection portions 31d, 31e are inserted in the guided portions 52b, 52c.

The plurality of guided portions 52b, 52c include one or more first guided portions 52b and one or more second guided portions 52c, wherein the one or more first guided portions 52b correspond to one or more first guide projection portions 31d, and the one or more second guided portions 52c correspond to one or more second guide projection portions 31e. When viewed in the depth direction D0, the first guided portions 52b are provided in the first area A1, and the second guided portions 52c are provided in the second area A2.

In an example shown in FIG. 5, the first guided portion 52b is a portion of the base portion 52 in which is formed a through hole that penetrates through the base portion 52 in the depth direction D0. The first guide projection portion 31d is inserted in the through hole of the first guided portion 52b.

On the other hand, the second guided portion 52c is a recess that is recessed from an edge of the base portion 52 on the second area A2 side toward the first area A1. The second guide projection portion 31e is fitted in the recess of the second guided portion 52c.

The first guide projection portion 31d and the second guide projection portion 31e restrict the first guided portion 52b and the second guided portion 52c from being displaced in a direction intersecting the depth direction D0.

As a result, as shown in FIG. 6, no matter to which of the first edge portion P1, a second edge portion P2 and a center portion P3 a user applies a pressing force F0, the button member 5 moves in parallel in the depth direction D0 by the action of the first guide projection portions 31d and the second guide projection portions 31e, wherein the first edge portion P1 is an edge portion of the push button portion 51 located far away from the push-in portion 7b, and the second edge portion P2 is opposite to the first edge portion P1.

With adoption of the operation switch device 4, no matter what portion of the push button portion 51 is pressed, the button member 5 moves in parallel in the depth direction D0 without being inclined, and the state of the tactile switch 7 is surely switched.

The base portion 52 further includes a plurality of board side restriction portions 52d, 52e and a plurality of exterior side restriction portions 52f, 52g.

The plurality of board side restriction portions 52d, 52e are formed to project toward the electronic board 6. The plurality of exterior side restriction portions 52f, 52g are formed to project toward the operation cover portion 31.

The plurality of board side restriction portions 52d, 52e include one or more first board side restriction portions 52d that are provided in the first area A1, and one or more second board side restriction portions 52e that are provided in the second area A2, when viewed in the depth direction D0.

In the example shown in FIG. 5, the plurality of board side restriction portions 52d, 52e include two first board side restriction portions 52d and two second board side restriction portions 52e.

An interval G0 between tips of the board side restriction portions 52d, 52e and the main surface 6a of the electronic board 6 is smaller than a maximum value in a range of an effective push-in depth of the push-in portion 7b with respect to the main body portion 7a of the tactile switch 7, and larger than a minimum value in the range of the effective push-in depth.

The range of the effective push-in depth is a range of a push-in depth of the push-in portion 7b with respective to the main body portion 7a that is effective in switching the state of the tactile switch 7.

When the push button portion 51 is pressed and the button member 5 is inclined, if the push button portion 51 is pressed until the tips of the board side restriction portions 52d, 52e abut on the electronic board 6, the inclination of the button member 5 is corrected.

Due to the action of the board side restriction portions 52d, 52e, the state of the tactile switch 7 is switched more surely in response to an operation made to the push button portion 51.

The plurality of exterior side restriction portions 52f, 52g include one or more first exterior side restriction portions 52f that are provided in the first area A1, and one or more second exterior side restriction portions 52g that are provided in the second area A2, when viewed in the depth direction D0.

In the example shown in FIG. 5, the plurality of exterior side restriction portions 52f, 52g include one first exterior side restriction portion 52f and two second exterior side restriction portions 52g.

Tips of the exterior side restriction portions 52f, 52g face the inner surface 31b of the operation cover portion 31 with a small interval therebetween. The plurality of exterior side restriction portions 52f, 52g prevent the button member 5 from rising from the electronic board 6 toward the operation cover portion 31.

APPLICATION EXAMPLES

In the above-described operation switch device 4, electronic components other than the LED element 8 and the tactile switch 7 may be implemented on the electronic board 6 at positions that face the rear surface 51b of the push button portion 51.

In addition, in the operation switch device 4, a plurality of exterior side restriction portions 52f, 52g may be formed to project from the inner surface 31b of the operation cover portion 31 toward the base portion 52.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An operation switch device comprising:
   an exterior member in which an opening is formed;
   a button member including a push button portion and an inner portion, the push button portion being partially inserted in the opening of the exterior member, the push button portion including an operation surface that is exposed to outside through the opening of the exterior member, the inner portion being formed inside the exterior member integrally with the push button portion; and
   an electronic board on which an electronic component and a push-in type switch are implemented, the electronic component facing a rear surface of the push button portion, the rear surface being on an opposite side to the operation surface, the push-in type switch being aligned with the electronic component, wherein
   the exterior member includes:
      a plurality of guide projection portions that project from an inner surface of the exterior member in a depth direction perpendicular to the electronic board,
   the inner portion includes:
      a first supported portion supported by a push-in portion of the push-in type switch;
      one or more second supported portions supported in a second area by the electronic board, the second area being adjacent to one side of the electronic component when viewed in the depth direction, the push-in type switch being present in a first area which is adjacent to another side of the electronic component that is opposite to the one side when viewed in the depth direction;
      one or more elastic portions that connect a portion including the second supported portions to a portion including the push button portion and the first supported portion, and are elastically deformed when the push button portion is displaced in a direction of approaching the electronic board by an external force acting on the operation surface; and
      a plurality of guided portions in which the plurality of guide projection portions are inserted such that the plurality of guide projection portions restrict the plurality of guided portions from being displaced in a direction intersecting the depth direction,
   the plurality of guide projection portions include:
      one or more first guide projection portions that are provided in the first area when viewed in the depth direction; and
      one or more second guide projection portions that are provided in the second area when viewed in the depth direction, and
   the plurality of guided portions include:
      one or more first guided portions that correspond to the one or more first guide projection portions; and
      one or more second guided portions that correspond to the one or more second guide projection portions.

2. The operation switch device according to claim 1, wherein
   the one or more second supported portions are two second supported portions that are arranged in line symmetry with respect to a straight line that passes through a center of the push-in portion of the push-in type switch and a center of the push button portion when viewed in the depth direction.

3. The operation switch device according to claim 2, wherein
   the inner portion further includes a coupling portion configured to couple the two second supported portions.

4. The operation switch device according to claim 1, wherein
   the elastic portions are formed to be folded in the depth direction.

5. The operation switch device according to claim 1, wherein
   the inner portion further includes, in the first area and the second area when viewed in the depth direction, a plurality of board side restriction portions that are formed to project toward the electronic board, and
   an interval between tips of the plurality of board side restriction portions and the electronic board is smaller than a maximum value in a range of an effective push-in depth of the push-in portion with respect to a main body portion of the push-in type switch, and larger than a minimum value in the range of the effective push-in depth.

6. The operation switch device according to claim 1, wherein
   the electronic component is a light emitting diode element.

7. An image forming apparatus for executing a print process to form an image on a sheet, the image forming apparatus comprising:
   the operation switch device according to claim 6; and
   a control device configured to switch the image forming apparatus from a standby state to a power saving state when the push-in type switch detects pressing of the push button portion of the operation switch device while the print process is not executed, wherein in the standby state, the light emitting diode element is lighted off and the print process can quickly be started being executed, and in the power saving state, the light emitting diode element is lighted on and smaller power is consumed than in the standby state.

* * * * *